M. THIELGES.
RUNNER ATTACHMENT FOR VEHICLES.
APPLICATION FILED FEB. 16, 1917.
1,251,445. Patented Dec. 25, 1917.
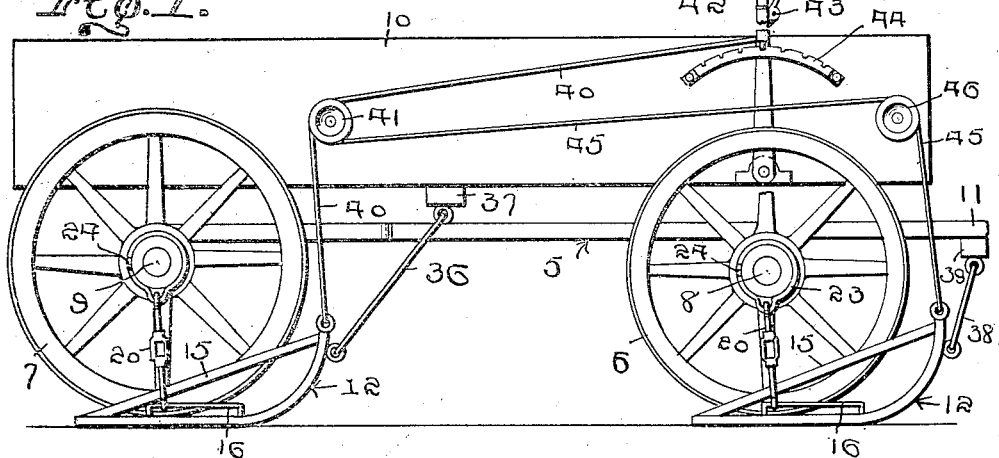
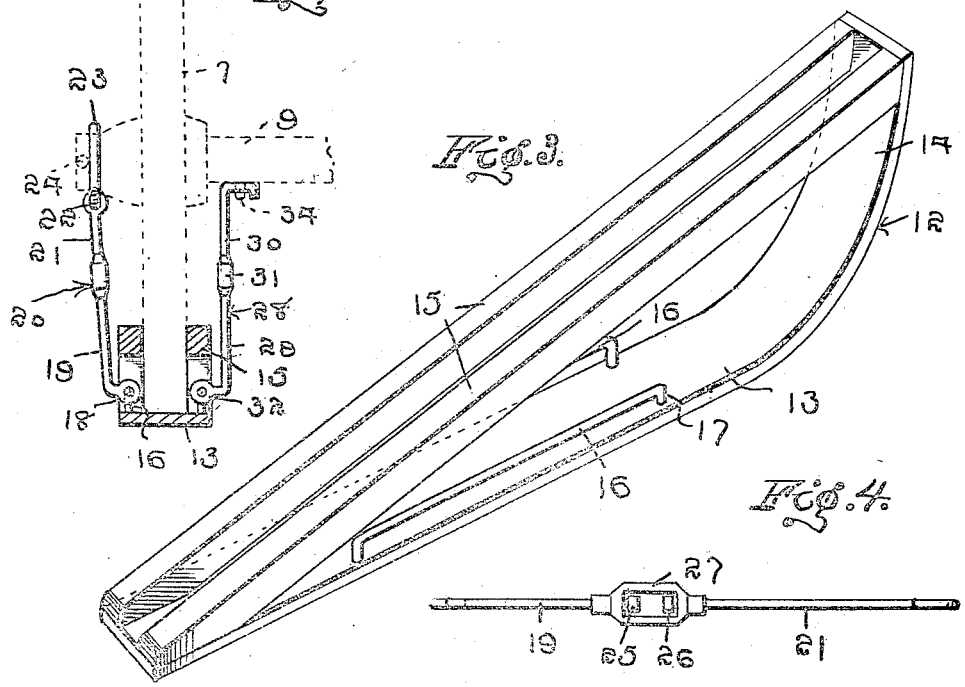
Inventor
M. Thielges.
Witnesses
M. Campbell
By
Attorney

UNITED STATES PATENT OFFICE.

MIKE THIELGES, OF TAUNTON, MINNESOTA.

RUNNER ATTACHMENT FOR VEHICLES.

1,251,445.  Specification of Letters Patent.  Patented Dec. 25, 1917.

Application filed February 16, 1917. Serial No. 149,019.

*To all whom it may concern:*

Be it known that I, MIKE THIELGES, a citizen of United States, residing at Taunton, in the county of Yellow Medicine, and State of Minnesota, have invented certain new and useful Improvements in Runner Attachments for Vehicles; and I do hereby declare the following to be a full, clear, and exact description of the invention, such as will enable others skilled in the art to which it appertains to make and use the same.

This invention has for its object to provide an improved runner attachment for vehicles including novel and efficient attaching means whereby the runner is securely held in operative position under the wheels of the vehicle.

Another object is to provide means for conveniently adjusting the runners and supporting them in inoperative position.

With these and other objects in view, the invention consists in the novel construction, combination and arrangement of parts as will be hereinafter specifically described, claimed and illustrated in the accompanying drawing, in which:

Figure 1 represents a side elevation of a wagon, showing the invention applied to use, Fig. 2 represents a vertical sectional view taken transversely through the runner and illustrating one of the vehicle wheels and axle in dotted lines, Fig. 3 represents a perspective view of the runner detached from the vehicle, and Fig. 4 represents a plan view of one of the extensible side braces of the runner detached.

Referring to the drawing in detail, wherein similar reference numerals designate corresponding parts throughout the several views, the numeral 5 indicates generally an ordinary type of wagon including the front and rear wheels 6 and 7, respectively, supported upon the axels 8 and 9, respectively. The vehicle body 10 is supported upon the axles and is connected in the usual manner with the tongue or draft pole 11.

The runners, designated generally by the numerals 12, of which there is a number corresponding to the number of vehicle wheels, each consists of the runner element 13, having an upwardly curved forward terminal 14 connected with the rear end of the horizontal portion by spaced inclined brace bars 15, which are spaced an adequate distance apart to accomodate the vehicle wheel, which latter rests upon the straight horizontally disposed portion of the runner element 13. Guide bars 16, having downwardly directed terminals 17, are fastened to the runner element 13 under the bars 15 and the guide rod on the outside wheel is connected with the apertured and offset lower terminal 18 of the lower section 19 of an extensible side brace, designated generally by the numeral 20. The upper section 21 of the side brace is provided with an apertured upper terminal 22 pivotally connected with a ring 23, which is rotatably mounted upon the outer terminal of the wheel hub and is held in position thereon by a removable pin or screw 24. The adjacent terminals of the brace sections 19 and 21 are provided with heads 25 and 26, respectively, which are slidably received in a coupling 27, permitting independent longitudinal movement of the brace sections. The heads 25 and 26 are adapted to limit the outward movement of the sections with relation to each other.

The guide rod 16 on the inside of the vehicle wheel is connected by an extensible brace, designated generally by the numeral 28, with the axle of the wheel, and this brace includes two sections 29 and 30, which are movably connected by a coupling member 31 similar to the coupling member 27, and the lower terminal of the lower section is offset and apertured, as indicated at 32, and slidably and pivotally mounted upon the inner guide rod 16. The upper terminal of the upper section is directed inwardly, as indicated at 33, and is pivotally supported in a U-shaped bearing member 34 attached to the adjacent vehicle axle.

The runner for each rear wheel of the vehicle is attached to a cable, chain or other flexible connecting member 36, which is attached at its opposite end to a cross rod 37 secured under the body 10 of the vehicle, and each of the front runners is connected by a flexible connecting member 38 with a cross rod 39 secured under the vehicle tongue 11, whereby the front and rear runners are retained in proper position with relation to the vehicle wheels during travel of the vehicle.

A flexible operating member 40 is attached to each rear runner, extends upwardly over a pulley 41 rotatably secured to the adjacent side of the wagon body 10 and is attached at its forward end adjacent the upper terminal of a hand lever 42, which latter is arranged conveniently near the driver of the vehicle and is locked in various adjusted positions by a preferred type of locking device 43, adapted to coöperate with a notched bar 44, secured to the wagon body. Each of the front runners 12 is connected with a flexible operating member 45, which extends upwardly over the pulley 46 rotatably secured to the sides of the wagon body and extends rearwardly from the pulley 46 and is connected with the operating member 40, whereby a longitudinal pull upon the member 40 effects a similar movement of the flexible member 45.

When the runners are placed in operative position, as shown in Fig. 1, they are retained in position upon the vehicle wheels by the brace bars 15 and side braces 20 and 28. The flexible members 36 and 38, connecting the rear and front runners with the body of the vehicle, are designed to prevent the runners from slipping rearwardly with relation to the vehicle wheels during travel of the vehicle. To detach the runners from the wheels the hand lever 42 is moved rearwardly, thus slackening the flexible members 40 and 45 and permitting the vehicle to be moved rearwardly off of the runners 13. When the weight of the vehicle is removed from the runners the hand lever 42 is swung forwardly, thus exerting a forward pull upon the flexible members 40 and 45 and drawing the runners upwardly to a substantially vertical position.

What I claim is:

1. A runner attachment for vehicles including a runner element having an upwardly curved terminal, guide rods carried by the runner element, extensible side braces connected with said rods and including independently movable sections, means for attaching said side braces to a vehicle, and spaced bars carried by the runner element for engagement with a vehicle wheel.

2. In a runner attachment for vehicles, a runner including a straight body portion having a curved terminal, guide rods carried by the runner element, extensible side members pivotally and slidably engaged with the guide rods and including independently movable sections, means for attaching said braces to a vehicle, and wheel-engaging bars carried by the runner element.

3. In a runner attachment for vehicles, a runner element including a straight body portion provided with a curved terminal, guide rods secured to the straight portion of the runner element, brace sections pivotally and slidably engaged with said guide rods, a second pair of brace sections, means for attaching the upper terminals of the second-mentioned brace sections to the vehicle, and means connecting the first and second-mentioned brace sections, permitting independent longitudinal movement thereof.

In testimony whereof I affix my signature in presence of two witnesses.

MIKE THIELGES.

Witnesses:
 L. P. FUNKE,
 J. M. EISCHEUS.

Copies of this patent may be obtained for five cents each, by addressing the "Commissioner of Patents, Washington, D. C."